(12) United States Patent
Crouan

(10) Patent No.: US 8,062,026 B2
(45) Date of Patent: Nov. 22, 2011

(54) DEVICE FOR INJECTION MOLDING

(75) Inventor: Jean-Baptiste Crouan, Vannes (FR)

(73) Assignee: Auray Plast, Auray (FR)

( * ) Notice: Subject to any disclaimer, the term of this patent is extended or adjusted under 35 U.S.C. 154(b) by 0 days.

(21) Appl. No.: 12/725,960

(22) Filed: Mar. 17, 2010

(65) Prior Publication Data
US 2010/0244322 A1 Sep. 30, 2010

(30) Foreign Application Priority Data
Mar. 25, 2009 (FR) ...................................... 09 01406

(51) Int. Cl.
*B29C 45/40* (2006.01)
(52) U.S. Cl. .......... 425/556; 425/DIG. 42; 425/DIG. 47
(58) Field of Classification Search ............... 264/328.1; 425/556, DIG. 42, DIG. 47
See application file for complete search history.

(56) References Cited

U.S. PATENT DOCUMENTS

| | | | | |
|---|---|---|---|---|
| 3,061,321 A | * | 10/1962 | Smith ........................... | 277/637 |
| 3,490,139 A | * | 1/1970 | McKinven, Jr. ............. | 29/527.1 |
| 3,656,227 A | * | 4/1972 | Weinand ........................ | 29/530 |
| 3,988,091 A | * | 10/1976 | Reichenbach ................. | 425/125 |
| 4,043,727 A | | 8/1977 | Henzl | |
| 4,155,153 A | * | 5/1979 | Bainard et al. ............... | 29/469.5 |
| 4,155,557 A | | 5/1979 | Grebert | |
| 5,217,732 A | * | 6/1993 | Rudolf et al. ................. | 425/572 |

FOREIGN PATENT DOCUMENTS

| | | |
|---|---|---|
| FR | 1.369.813 | 8/1964 |
| FR | 2 374 575 | 7/1978 |
| GB | 1331448 | 9/1973 |
| JP | 2002-127209 | * 5/2002 |

* cited by examiner

*Primary Examiner* — Jill Heitbrink
(74) *Attorney, Agent, or Firm* — Harness, Dickey & Pierce, P.L.C.

(57) ABSTRACT

The present disclosure relates to a device for the injection molding of an item including at least one face, a protruding peripheral part provided with an edge for the connection with another face, said device including mold elements movable with respect to each other and jointly cooperating by delimiting therebetween joint planes as well as a cavity intended to be filled with liquid plastic material through injection channels to form said item after the ejection from the mold, characterized in that it includes a mold element to form the protruding part of the item, whose joint plane with the immediately adjacent front mold element is angularly oriented from said edge and on at least a portion of the length thereof, according to the direction of ejection.

18 Claims, 7 Drawing Sheets

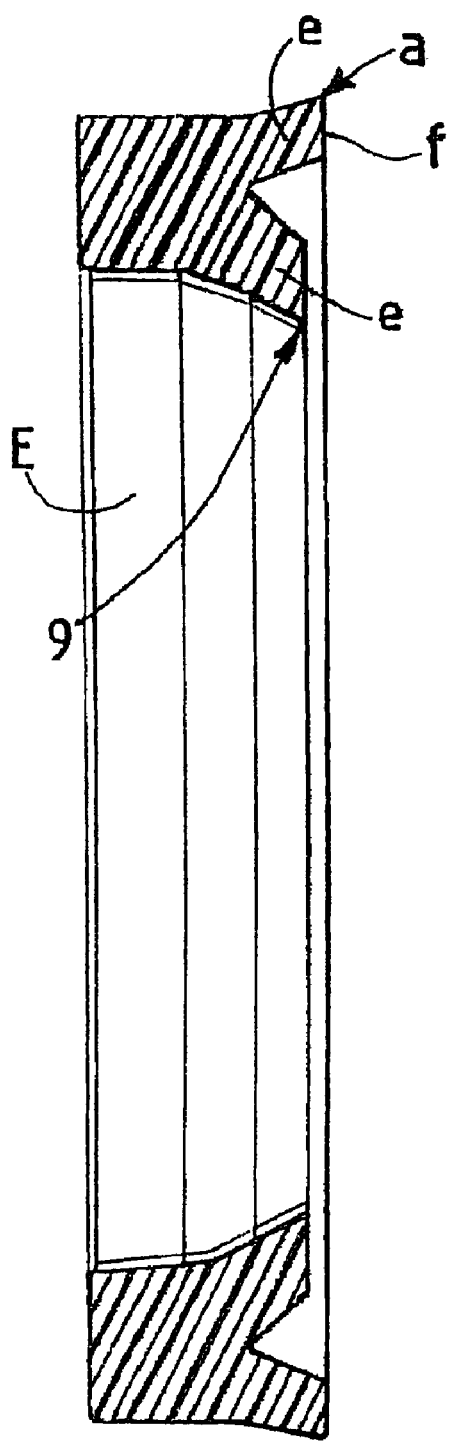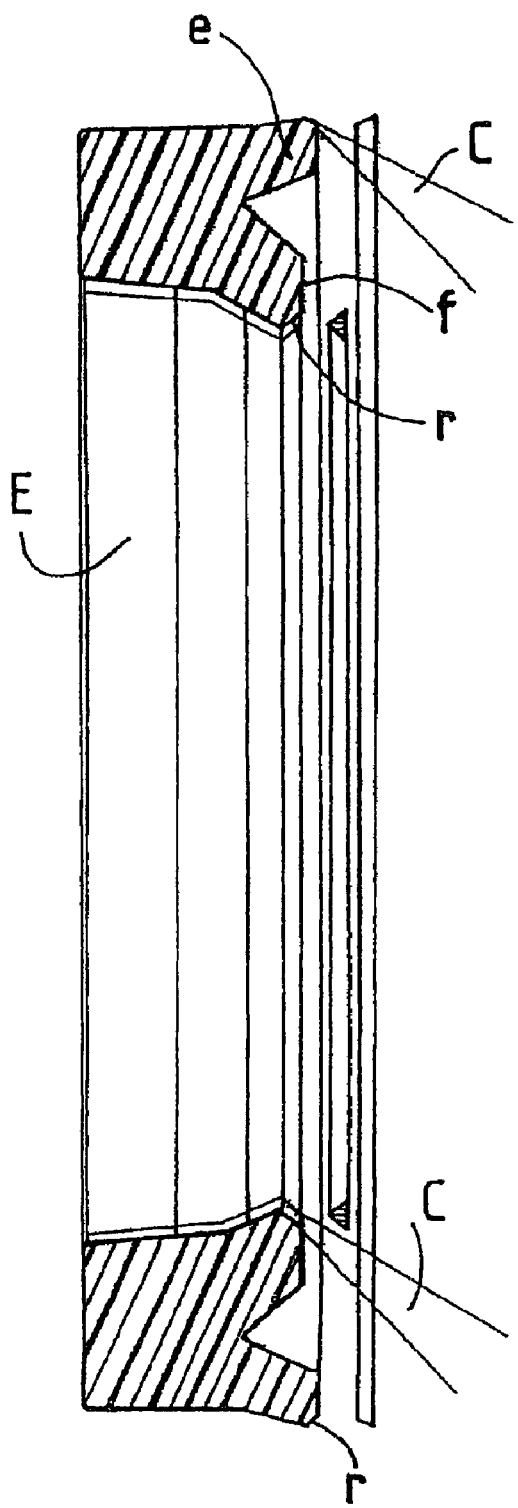
FIG.1B
Prior Art
FIG.1C
Prior Art

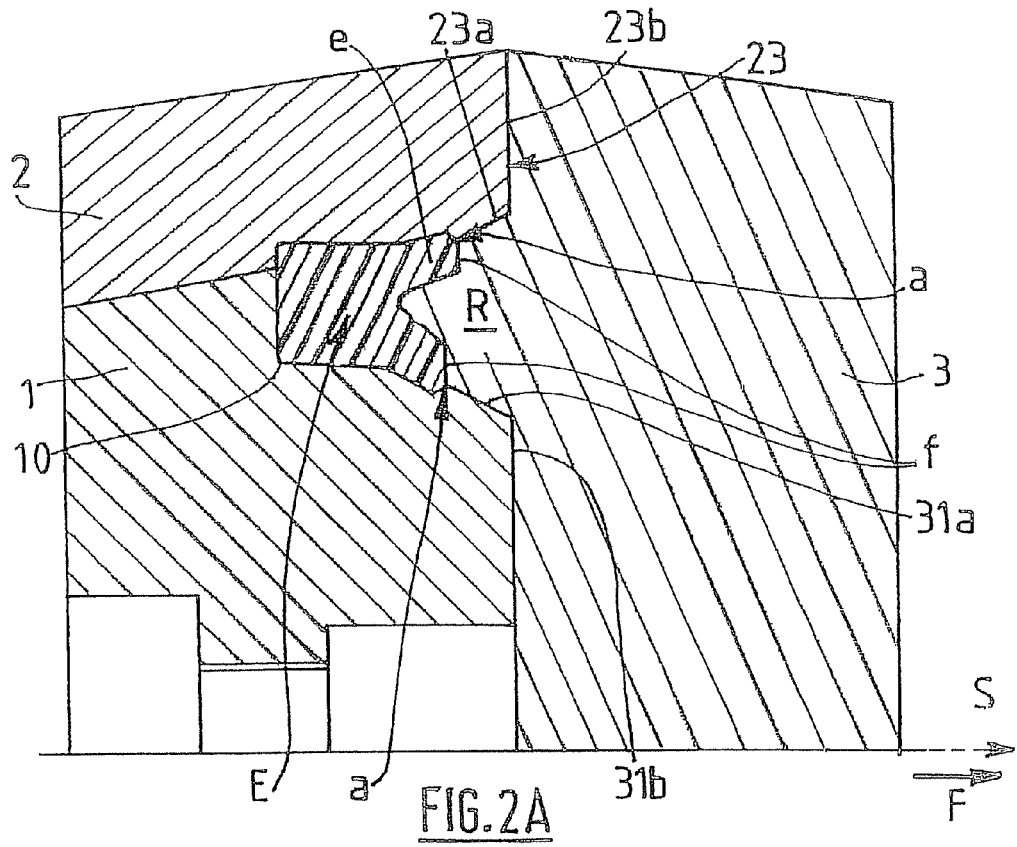
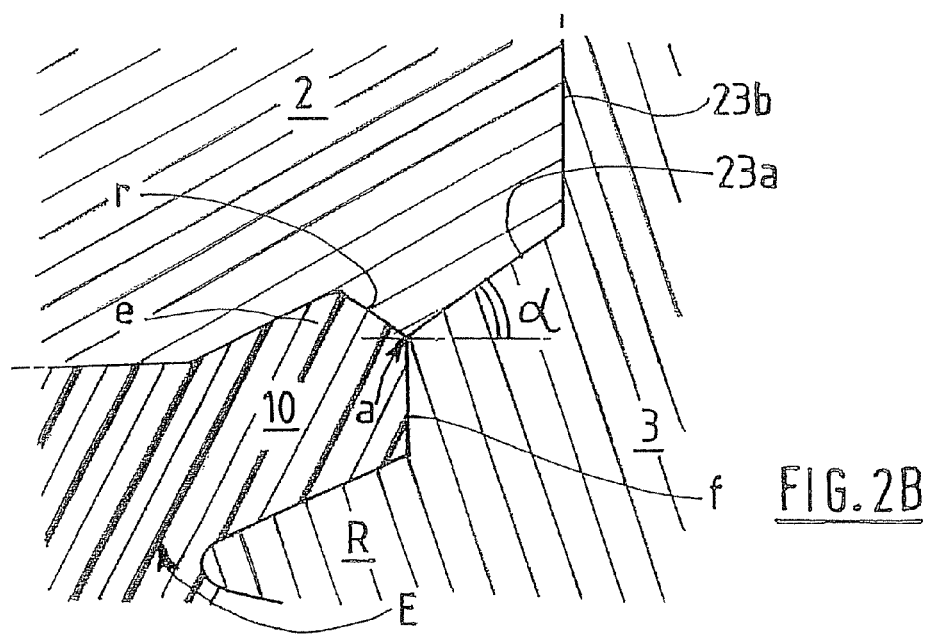

DEVICE FOR INJECTION MOLDING

CROSS-REFERENCE TO RELATED APPLICATIONS

This application claims the benefit and priority of French Application FR 0901406, filed on Mar. 25, 2009, which is incorporated by reference herein.

BACKGROUND AND SUMMARY

The invention relates to the field of the injection molding of items with plastic material.

In the state of the art, devices are known which are intended to be provided on presses to perform the molding of items through the injection of pressurised liquid plastic material. Such devices generally include mold elements which are movable with respect to each other and jointly cooperating by delimiting therebetween on the one hand joint planes and on the other hand a cavity intended to be filled with a liquid plastic material through injection channels with a view to form said item after ejection from the mold. When the production concerns items including, on at least one face, a protruding peripheral part such as a bossing or a lip provided with an edge for the connection with another adjacent face, the joint plane is tangent to such other face. In this case, it is necessary to carry out a subsequent machining of the item at said edge with a view to eliminating the flash produced at the joint plane and to obtaining the dimensions imposed by the specifications, for example by making a chamfer. Now this operation is difficult since it is carried out manually and requires specific tools on a work station which must be secured.

Conventional molding devices are thus often the origin of numerous problems relating to the quality and reliability upon the utilization of the item, more particularly when it is a technical part such as a sealing gasket. As a matter of fact, machining then concerns a functional area of the part which may have serious effects if it is not carefully inspected.

The present invention aims at solving the technical problems met by the prior art in a simple and efficient way. This goal is reached, according to the invention, using a device for the injection molding characterized in that it includes a mold element to form the protruding part of the item, whose plane of connection with the immediately adjacent front mold element is angularly oriented from said edge and on at least a portion of the length thereof according to the direction of ejection. Thanks to the invention, the joint plane is shifted out of the protruding functional part which has no more flash when the item is ejected from the mold. The subsequent machining of this part is no longer necessary then.

According to an advantageous characteristic, said joint plane is oriented along an angle between 10° and 80° with respect to the axis of symmetry of the cavity. According to another advantageous characteristic, said mold element of the protruding part has a draft intended for the molding of the protrusion connected to the joint plane frontwards through a chamfer extending up to said edge. Preferably, said front mold element has a plane face perpendicular to the axis of symmetry of the cavity. According to a specific alternative solution, said mold elements and said cavity have rotation symmetry about the axis of said cavity. According to another alternative solution, said mold element of the protruding part has a globally tapered shape.

In a particular embodiment of the invention proper to the production of items having two protruding parts each having an edge, the device then includes a central mold element providing the molding of the second protruding part and having a joint plane with said front mold element angularly oriented from said second edge and at least on a portion of the length thereof, according to the direction of ejection. In this case, said mold element of the first protruding part is a side element whose plane of connection with said central mold element is inclined rearwards and towards the axis of symmetry of said cavity. According to still another advantageous characteristic, said injection channels are arranged through the front mold element. Another object of the invention is a method for the production of an item of the type including at least one protruding peripheral part provided with an edge for the connection with the front face thereof, using the molding device according to the invention. Still another object of the invention is the utilization of the device of the invention to produce an item such as a simple or double lip annular sealing gasket made of elastomer.

The device and the method according to the invention make it possible to simplify the operations of the molding production of an item having at least one protruding functional part. In addition, the invention makes it possible to improve productivity and cost efficiency of industrial facilities since the output of the press supplying the power no longer depends on the frequency and duration of the subsequent machining operations which have become useless. The deviations in dimensions which existed, on the one hand, between the batches of produced items and, on the other hand, on the same item between the various protruding parts because of the additional operations of deflashing and finishing are no longer necessary, since such operations are eliminated and the items already have correct dimensions when leaving the mold. The risks of deterioration in the quality of the items and more particularly the edge area which resulted from the wear of machining tools and more particularly cutting tools are significantly reduced. Eventually, the invention makes it possible to avoid chips resulting from the deflashing operations which were the sources of pollution on the industrial site and to save energy by eliminating the need for machining stations.

BRIEF DESCRIPTION OF THE FIGURES

Other characteristics, details and advantages of the invention will appear upon reading the following description and referring to the appended figures, wherein:

FIG. 1A shows a sectional half view of a device of the prior art and FIGS. 1B and 1C are side views of a molded item with the device of FIG. 1A, respectively prior to and after machining;

FIGS. 2A and 2B are sectional half views of one embodiment of the device of the invention (detailed view in FIG. 2B)

For clarity, identical or similar elements are referred to using identical reference numbers on all the figures.

DETAILED DESCRIPTION OF ONE EMBODIMENT

Figure 1A:
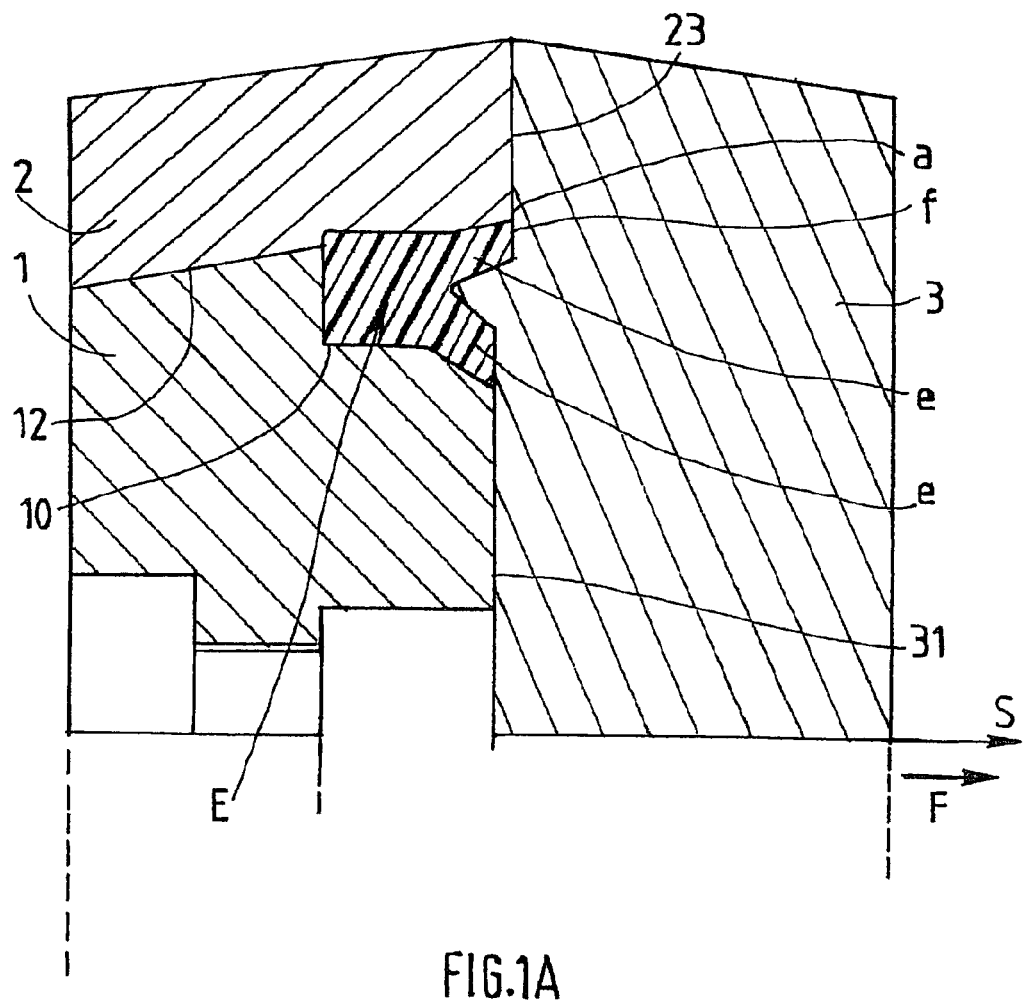

The device shown in FIG. 1A is intended to provide an injection press (not shown) to carry out industrial operations for the molding of items having, on at least one face, a protruding part. Such items are for example hydraulic sealing gaskets E having an annular shape, with a simple or double peripheral lip e, as shown in FIGS. 1B and 1C. Each one of the lips e is here protruding and provided with an upper edge a located at the connection with the front face f of the lip.

This device includes respectively central, side and front mold elements 1, 2, 3, movable with respect to each other and jointly cooperating by defining therebetween joint planes 12, 23, 31 as well as a cavity 10 intended to be filled with liquid plastic material through injection channels (not shown in FIGS. 1A and 2A) with a view to form said item after ejection from the mold. The cavity 10 forms the mold proper and thus has a print shape matching that of the item to be produced. This shape is here annular with an axis of symmetry S. The ejection is obtained by successive motions in translation of the front element 3 then of the central element 1 along the direction of the arrow F.

In FIG. 1A, the joint plane 23 between the side mold element 2 and the front mold element 3 is tangent with the front face f of the protruding lip e of the gasket E. FIG. 1B shows the annular gasket E after the ejection from the mold, after the ejection of the device of FIG. 1A. In FIG. 1C, the lip e is machined with a cutting tool C with a view to obtaining a chamfer r at the edge a.

This operation aims at eliminating irregularities (which are not visible in FIG. 1B) which are produced because of the orientation of the joint plane 23 as it is shown in FIG. 1A. As a matter of fact, after the ejection from the mold and cooling of the item, the profile of the lip or more generally that of the protruding part has surface defects in the form of flash of plastic material. This phenomenon results from the fact that, during the molding operation, the rate of the pressurised liquid plastic material is always low in the delimited space, at the joint plane between the metal surfaces, opposite the mold elements. The device of the invention does not eliminate such phenomenon which is inherent to injection molding operations but makes it possible to move the position of the flash to a non functional area of the item.

Figure 2C:
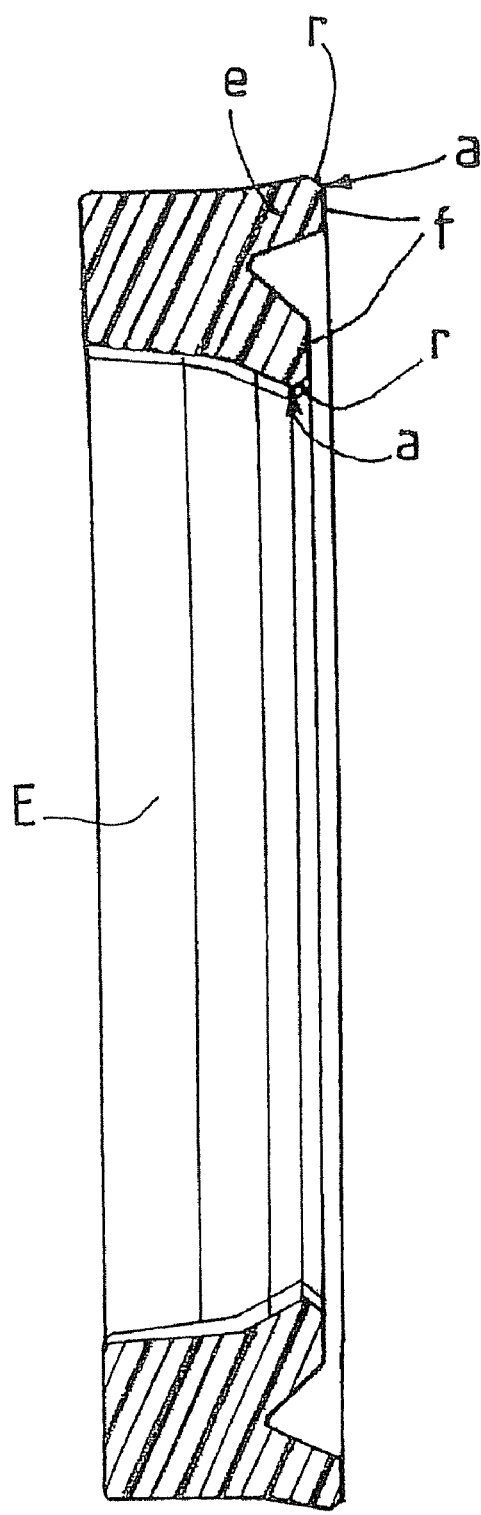
FIG. 2C is a side view of a molded item obtained with the device of FIG. 2A.
Figure 3A:
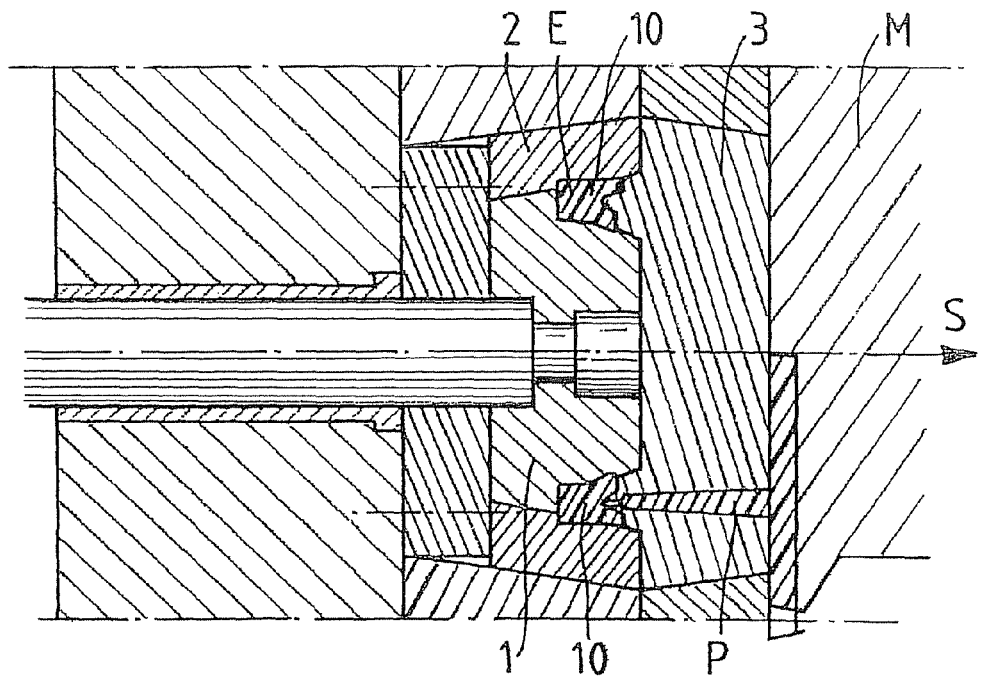
FIGS. 3A to 3F show total sectional views of the device of FIG. 2A during the successive steps of the molding method according to the invention.

The embodiment of the device according to the invention shown in FIG. 2A and in greater detail in FIG. 2B includes a central mold element 1, a side mold element 2 and a front mold element 3. The mold elements 1, 2, 3 and the cavity 10 have rotation symmetry about the axis of symmetry S of said cavity, as is shown in FIG. 3A. The side mold element 2 is intended to form the protruding part e of the molded item, by cooperating with the front mold element 3.

The joint plane 23 between the side 2 and front 3 mold elements is angularly oriented from the edge a according to the direction of ejection F, as shown in FIG. 2 and unlike the device of FIG. 1A in which the same joint plane was perpendicular to the direction of ejection F at the protruding part e. The angular orientation of the plane 23 is here provided on a portion 23a of the length thereof only. A portion 23b is here perpendicular to the axis of symmetry S of the annular cavity 10, but it could have another inclination as a function of the mold geometry.

The joint plane 31 between the central element 1 and the front element 3 has the same configuration with a portion 31a starting from the edge a angularly oriented according to the direction of ejection F. The front mold element 3 has a plane face f perpendicular to the axis of symmetry S of the cavity 10 (refer to FIG. 2A). The mold elements 1, 2 of the protruding part e have a globally tapered shape. The front mold element 3 has a cylindrical shape with a ring R in relief closing the cavity 10 frontwards and intended for the molding of the intermediate groove located between the two lips of the item.

In FIG. 2B, the joint plane 23a is oriented along an angle α of approximately 45°, but more generally such angle is to be contained between 10° and 80° with respect to the axis of symmetry S of the annular cavity 10, whether for plane 23a or for plane 31a, without the values of both angles being necessarily identical. The side mold element 2 of the protruding part e has a draft intended for the molding of the protrusion and connected frontwards to the joint plane 23a by a chamfer r extending up to the edge a, as shown in FIG. 2B. FIGS. 3A to 3F show the various phases of the molding method of the invention implemented using the hereabove described device.

Figure 3B:
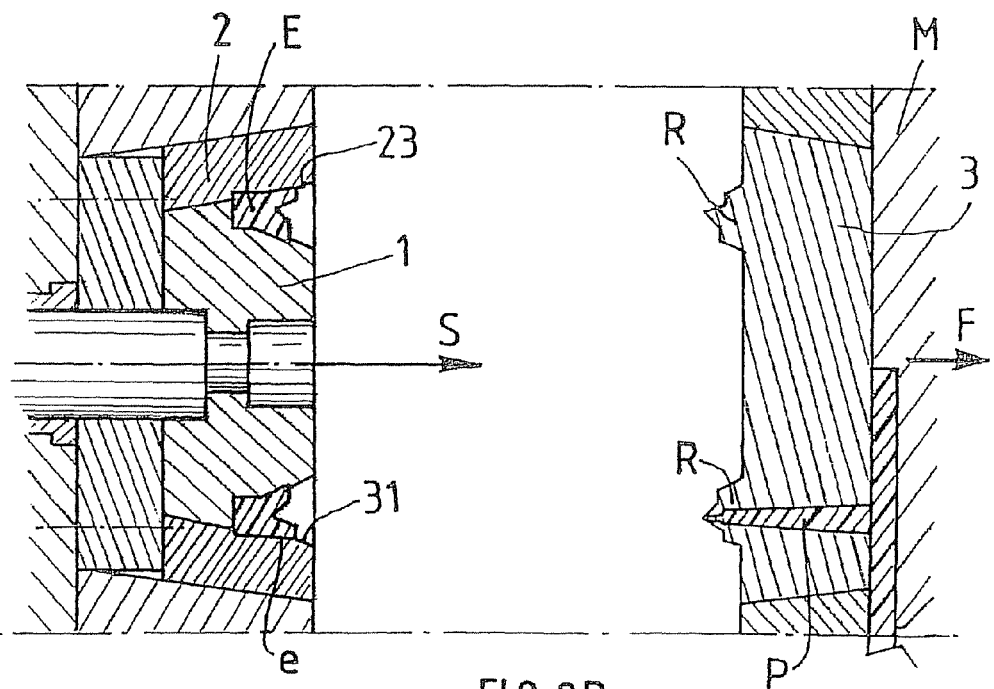

In FIG. 3A, the mold is closed and the cavity 10 of the device is filled with a liquid plastic material (for example for joints, a generally hot and pressurised elastomer material such as polyurethane, polybutadiene, . . . ) through injection channels p arranged in the relief R of the front mold element 3. In FIG. 3B the mold holder M is removed in the direction F, which takes away the front mold element 3 by separating the cavity from the injection channels p. The groove located between the two lips is thus removed from the mold. At the same time, the injection channels are released and the mold holder is separated from the front element 3.

Figure 3C:
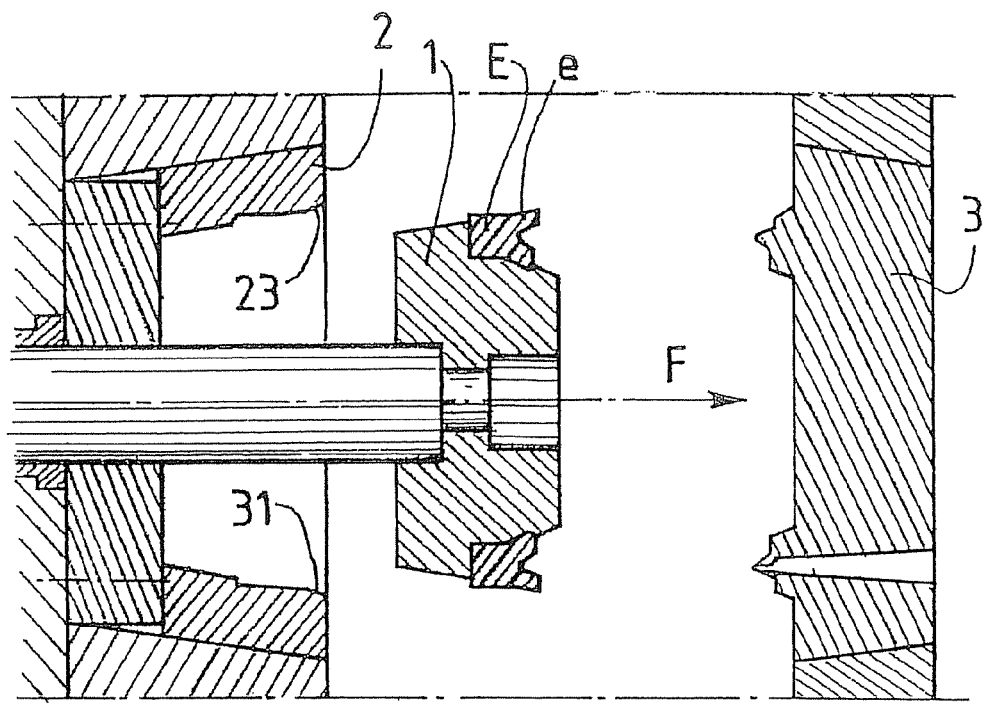

In FIG. 3C, the piston separating the central element 1 of the mold is pushed frontwards along the direction F with respect to the side element 2, which results in the unmolding of the protruding exterior part e. During this phase, the protrusion e is forced to bend towards the axis S by forcing the joint plane 23, 31. This delicate passage is facilitated by providing a lubricating coating or by providing an appropriate surface treatment beforehand on the internal wall of the side mold element 2.

Figure 3D:
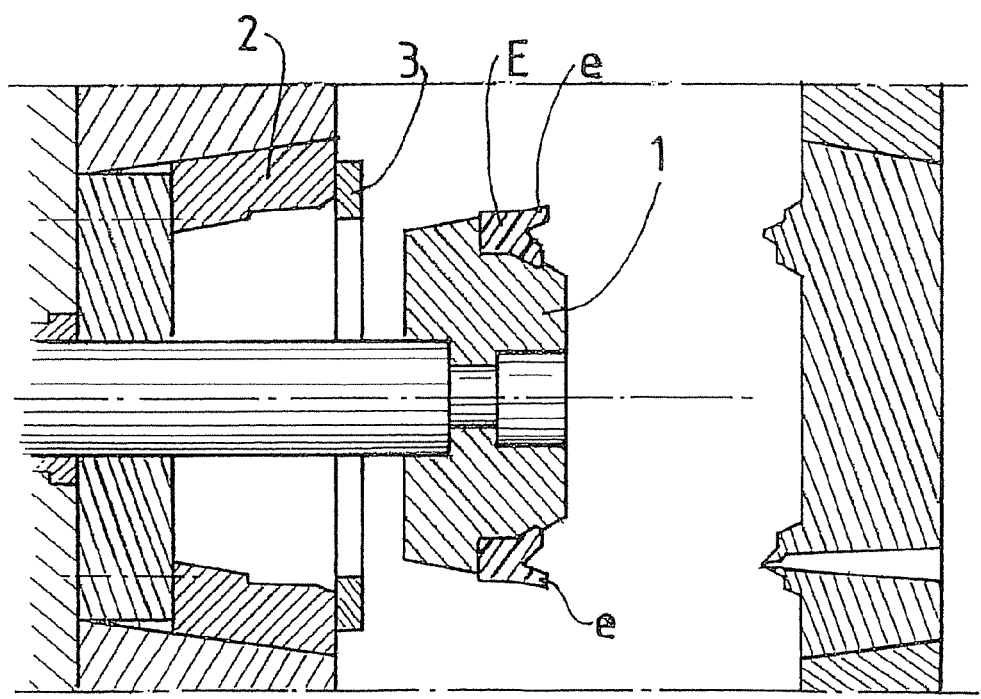
Figure 3E:
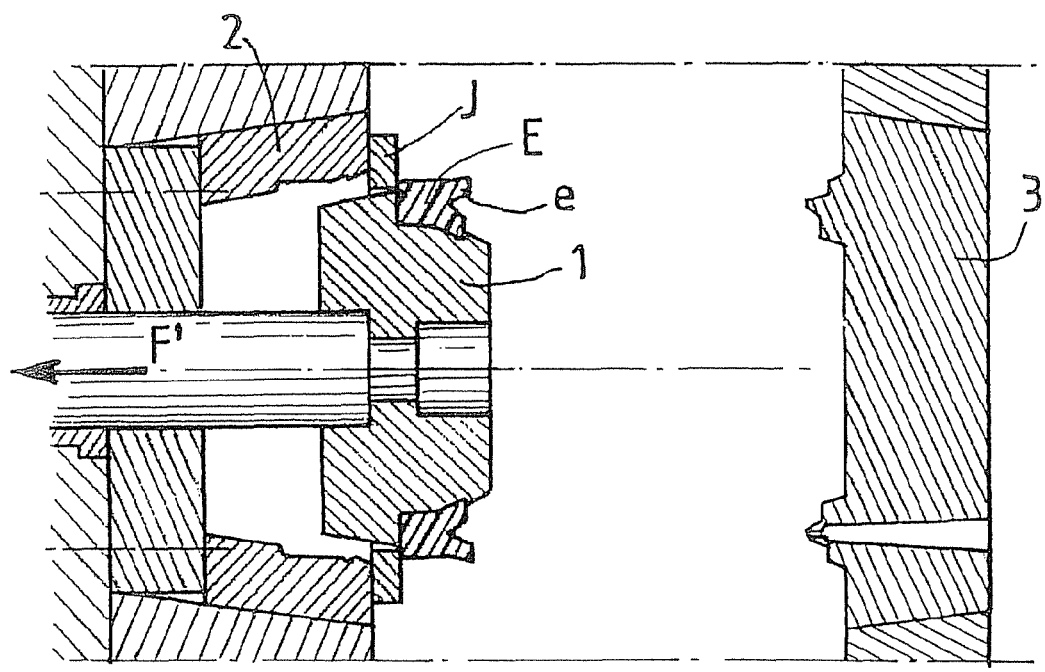
Figure 3F:
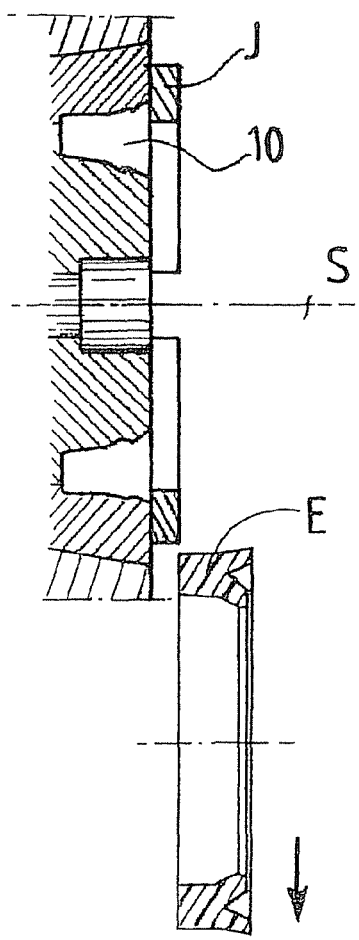

In FIG. 3D, a set J of ejection plates is positioned around the piston, the position thereof being determined beforehand as a function of the location of the rear part of the item E. Then, as shown in FIG. 3E, the piston is pushed backwards in the direction of the arrow F' with the central element 1, so as to have the rear part of the item rest against the set J of plates. This resting combined with a total recoil of the piston up to the initial position thereof results in the pushing and complete unmolding of the item E which can thus be collected by gravity under the device, as shown in FIG. 3F. At the end of the cycle, the return motion of the mold elements 1, 2, 3 to the initial position thereof is made to close the cavity 10 again and to prepare the molding of a new copy of the item. The device of the invention can be applied to a so-called multi-print mold, i.e. including several cavities 10 so as to increase the capacity and rate of production.

What is claimed is:

1. An injection molding device for manufacturing an article including at least on a first side face, a first protruding part having a first edge for connecting the first side face with a front face, the injection molding device comprising:
   a first side mold section adapted for forming the entire first side face of the article and at least a first portion of a rear face of the article;
   a front mold section adapted for forming at least a portion of the front face of the article adjoining the first edge, and moveable with respect to the first side mold section in a direction of ejection, wherein the first side mold section and the front mold section define therebetween a first joint plane adapted to be angularly oriented from the first edge of the article on at least a portion of the length thereof, with respect to the direction of ejection;
   a second side mold section adapted for forming an entire second side face of the article opposite the first side face and a remaining portion of the rear face of the article, the second side mold section moveable with respect to the first side mold section and the front mold section in the direction of ejection, wherein the second side face of the article includes a second protruding part having a second edge for connecting the second side face with the front face of the article, and the second side mold section and the front mold section define therebetween a second joint plane adapted to be angularly oriented from the second edge of the article on at least a portion of the length thereof, with respect to the direction of ejection.

2. A device according to claim 1, wherein at least one of the joint planes is oriented along an angle between 10° and 80° with respect to an axis of symmetry of a cavity.

3. A device according to claim 1, wherein the front mold section of the first protruding part has a draft intended for the molding of the first peripheral part and is connected frontwards to the first joint plane by a chamfer extending up to the edge of the article.

4. A device according to claim 1, wherein the front mold section has a plane face perpendicular to an axis of symmetry of a cavity.

5. A device according to claim 1, wherein the mold sections and a cavity have rotation symmetry about an axis of the cavity.

6. A device according to claim 1, wherein the front mold section has a globally tapered shape.

7. A device according to claim 1, further comprising a central mold section ensuring the molding of a second protruding peripheral part having a second edge, the central mold section having a third joint plane with the front mold section being angularly oriented from the second edge at least on a portion of the length thereof, according to the direction of ejection.

8. A device according to claim 7, wherein the front mold section is a side element whose joint plane with the central mold section is inclined backwards and towards an axis of symmetry of a cavity.

9. A device according to claim 1, further comprising injection channels provided through the front mold section.

10. The device according to claim 1, wherein the article is an elastomeric simple or double lip sealing annular gasket manufactured within a cavity in the mold sections.

11. The device according to claim 1, wherein the first side mold section includes a chamfer forwardly extending up to the first joint plane with the front mold section.

12. The device according to claim 1, wherein the front mold section forms the entire front face of the article.

13. The device according to claim 1, wherein the first side mold section and the front mold section cooperate with remaining mold sections to define a cavity that receives a liquid plastic material through injection channels to form the article.

14. The device according to claim 1, wherein at least the first protruding part of the article is flexible during ejection and the first side mold section is adapted to releasably retain the article when separated from the front mold section and remaining mold sections during ejection.

15. An injection molding device comprising:
a first side mold section forming an entire first side face of an article including a first protruding part having a first edge for connecting the first side face with a front face, and at least a first portion of a rear face of the article;

a front mold section forming at least a portion of the front face of the article adjoining a first edge, and moving with respect to the first side mold section in a direction of ejection, the first side mold section and the front mold section defining therebetween a first joint plane angularly oriented from the first edge of the article on at least a portion of a length thereof, with respect to the direction of ejection;

a second side mold section forming an entire second side face of the article opposite the first side face and a remaining portion of the rear face of the article, the second side mold section moving with respect to the first side mold section and the front mold section in the direction of ejection;

the second side face of the article including a second protruding part having a second edge connecting the second side face with the front face of the article;

the second side mold section and the front mold section defining therebetween a second joint plane angularly oriented from the second edge of the article on at least a portion of the length thereof, with respect to the direction of ejection;

an actuator selectively advancing and retracting the second side mold section with respect to the first side mold section in the direction of ejection;

ejector plates located adjacent the actuator and moving transverse to the direction of ejection;

the article being a flexible annular seal defining an axis;

the first side mold section circumscribing the second side mold section and together, the first side mold section, the front mold section, and the second side mold section defining a cavity that receives a liquid plastic material through injection channels to form the article, and having rotational symmetry about the axis;

the second side mold section releasably retaining the article when separated from the first side mold section and the front mold section during ejection; and the ejector plates engaging the first portion of the rear face of the article as the actuator retracts the second side mold section towards the first side mold section during ejection, and dislodging the article from the second side mold section.

16. A device according to claim 15, wherein the first joint plane is oriented along an angle between 10° and 80° with respect to an axis of symmetry of the cavity.

17. A device according to claim 15, wherein the front mold section has a globally tapered shape.

18. A device according to claim 15, wherein the front mold section is a side element whose joint plane with a central mold section is inclined backwards and towards an axis of symmetry of the cavity; and wherein the injection channels are provided through the front mold section.

* * * * *